United States Patent
Alferdaous Alazem et al.

(10) Patent No.: US 12,189,026 B1
(45) Date of Patent: Jan. 7, 2025

(54) RADAR ANOMALY DETECTION BASED ON MULTISTAGE CLUSTERING

(71) Applicant: Zoox, Inc., Foster City, CA (US)

(72) Inventors: Badeea Ferdaous Alferdaous Alazem, Redwood City, CA (US); Patrick Blaes, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 364 days.

(21) Appl. No.: 17/855,312

(22) Filed: Jun. 30, 2022

(51) Int. Cl.
*G01S 13/931* (2020.01)
*G01S 7/40* (2006.01)
*G01S 13/89* (2006.01)

(52) U.S. Cl.
CPC ............. *G01S 13/931* (2013.01); *G01S 7/40* (2013.01); *G01S 13/89* (2013.01)

(58) Field of Classification Search
CPC ...................................................... G01S 13/72
See application file for complete search history.

(56) References Cited

U.S. PATENT DOCUMENTS

2019/0107615 A1* 4/2019 Eljarat .................. G01S 13/931
2022/0153297 A1* 5/2022 Chen ..................... G01S 13/931

FOREIGN PATENT DOCUMENTS

| CN | 114578341 A | * | 6/2022 | ............ G01S 13/72 |
|---|---|---|---|---|
| GB | 2590115 A | * | 6/2021 | .......... G01S 13/931 |
| JP | 2018155607 A | * | 10/2018 | ............... G01S 7/40 |
| JP | 6769898 B2 | * | 10/2020 | ............... G01S 7/40 |

OTHER PUBLICATIONS

"Who We Are: Our Brands"; publication of the Wi-Fi Alliance; Austin, TX, USA; posted on the Internet at wi-fi.org; copyright in the year 2024. (Year: 2024).*

* cited by examiner

*Primary Examiner* — Bernarr E Gregory
(74) *Attorney, Agent, or Firm* — Lee & Hayes, P.C.

(57) ABSTRACT

Techniques for detecting and modifying radar data anomalies using multistage clustering are described herein. In some examples, radar data including a set of radar points may be captured by a vehicle operating within an environment. The vehicle may determine a radar point subset by clustering the radar data based on the range and doppler values of the radar points. The vehicle may analyze the azimuth values associated with the radar point subset, including evaluating the azimuth values of the radar point subset relative to one or more azimuth error ranges determined based on the radar antenna configuration and/or multipath detections. When detecting anomalous and/or invalid radar points having azimuth values within an azimuth error range, the vehicle may modify the subset of radar points to mitigate the anomalous or invalid radar points.

20 Claims, 8 Drawing Sheets

RADAR ANOMALY DETECTION BASED ON MULTISTAGE CLUSTERING

BACKGROUND

Radar generally measures the distance from a radar device to the surface of an object by transmitting radio waves and receiving a reflection of the radio waves from the surface of the object, which may be read by a sensor of the radar device. The sensor may generate a signal based at least in part on radio waves incident on the sensor. This signal may include a return signal attributable to the reflection. Within the context of autonomous vehicles, radar systems may be used to detect objects in driving environments. The radar data may be used to analyze the objects, after which the vehicle may determine a route to safely and efficiently navigate the environment. For instance, autonomous vehicles may use radar data to detect and avoid obstructions, such as pedestrians, within a planned driving path. However, radar devices may provide noisy and/or invalid radar data in some instances, caused by anomalies within the environment and/or the design and configuration of the radar devices themselves. Such instances of inaccurate radar data can present challenges for vehicle navigation and safety when controlling autonomous vehicles within an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
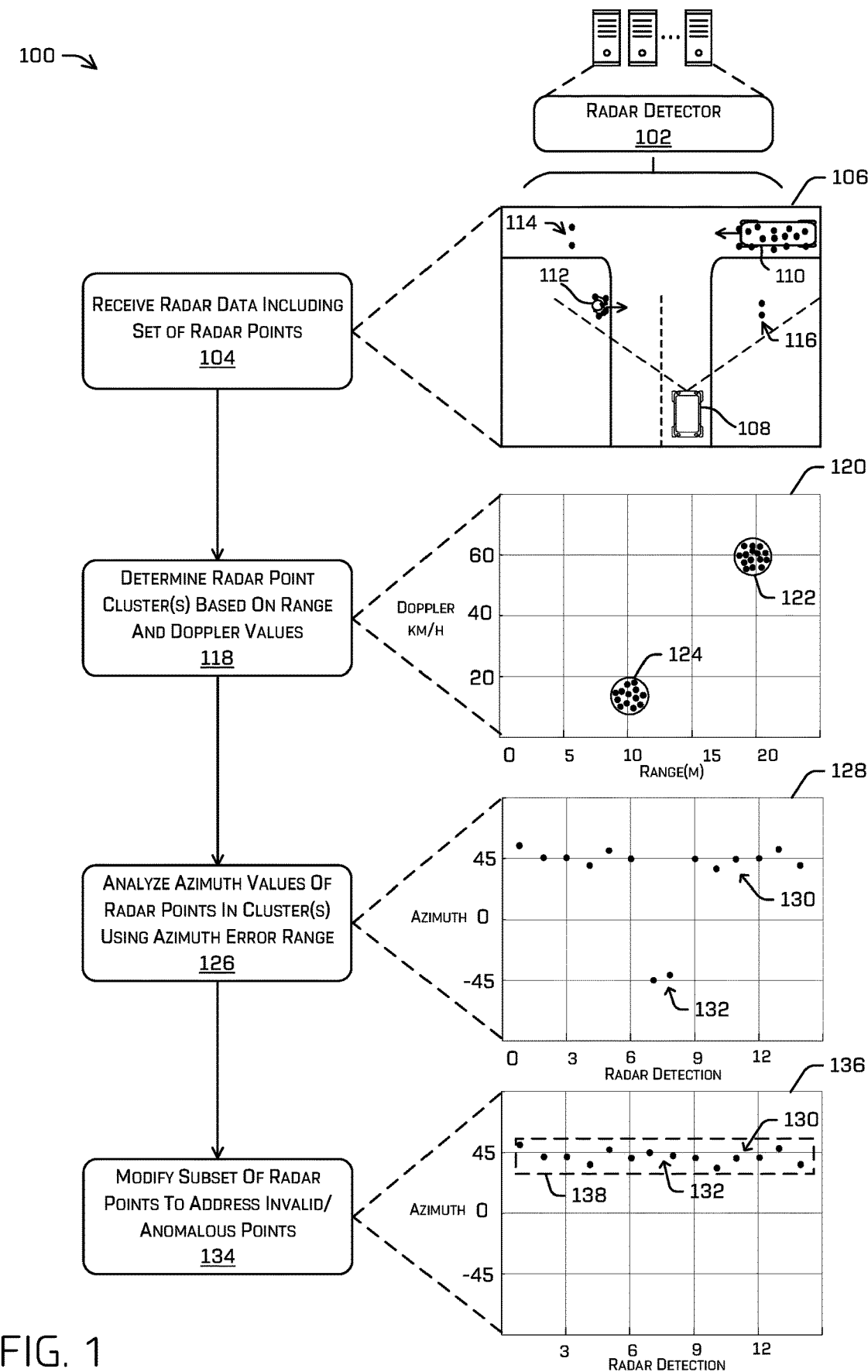
FIG. 1 is a pictorial flow diagram illustrating an example technique for modifying a received set of radar points using multistage clustering based on an azimuth error range, in accordance with one or more examples of the disclosure.

This application relates to detecting radar data anomalies and modifying radar data using multistage clustering techniques. As described in various examples herein, radar data including a set of radar points may be captured by a vehicle operating in an environment. A radar detector and/or radar data analyzer within the vehicle may determine a subset of radar points by clustering the radar data based on the range and doppler values. Within a radar point cluster, the radar detector may analyze the azimuth data to identify radar points within one or more azimuth error ranges. In various examples, azimuth error ranges may be determined based on the configuration (or alignment) of the radar antennae within the radar device used to capture the data. Additionally or alternatively, azimuth error ranges may be determined as multipath azimuth regions, based on an analysis of the radar point cluster and/or other objects in the environment. The radar detector may detect radar data anomalies and/or invalid radar points within the radar point cluster, based on identifying radar points having azimuth values within an azimuth error range, and then may modify the radar point cluster to mitigate the data anomalies and/or invalid radar points.

In certain examples, the radar detector may perform a multistage clustering on the radar data, in which the radar data is initially clustered based on the range data component (e.g., distance-to-target data) and the doppler data component of the radar points. After an initial clustering based on the range and doppler data, the radar detector may analyze the additional data components of the radar points, such as the azimuth and/or elevation data components, to detect anomalies and/or invalid points within the radar point cluster. The radar detector may modify the initial radar point cluster based on any anomalies or invalid radar points detected during the analyses of the azimuth and/or elevation data components. For example, modifications may include removing or modifying any radar points having azimuth values within particular azimuth ranges, which may be referred to as azimuth error ranges. As described below, azimuth error ranges may be determined based on the configuration and alignment of the individual radar antenna with the radar device, which may cause certain radar points to have inaccurate azimuth values that fall predictably within an azimuth error range. Other azimuth error ranges may correspond to ranges of azimuth values identified as being multipath detections that are separate from the azimuth range of the detected object.

In some examples, the techniques described herein may be performed by autonomous vehicles using radar devices and radar detector systems to navigate within driving environments. The radar data captured by a radar device may include a set of radar points representing radar detections of physical objects in the environment. In some examples, a vehicle may determine one or more subsets (e.g., clusters) of radar points from the set of radar points, by clustering based on range and doppler data. After determining potential radar data anomalies and/or invalid radar points using the techniques described herein, the vehicle may modify the anomalous/invalid radar points, and then provide the modified radar data to various vehicle components (e.g., a perception component, prediction component, planning component, etc.) for additional processing and vehicle operations. As discussed herein, these techniques may improve vehicle safety and driving efficiency by reducing or mitigating the effects of erroneous radar points and improving the overall accuracy of the radar data generated and used by the vehicle. By improving the accuracy of the radar data generated by the vehicle, the techniques herein can provide tangible improvements to any of the downstream vehicle systems that rely on the radar data to perform object classification and prediction, vehicle navigation, route planning, incident avoidance, and the like, thus improving the overall vehicle safety and efficiency in various driving environments.

When an autonomous vehicle is operating in a driving environment, the vehicle may use one or more radar devices to capture radar data of the surrounding environment. The vehicle may analyze the radar data to detect and classify various objects within the environment, including dynamic objects that are capable of movement (e.g., vehicles, motorcycles, bicycles, pedestrians, animals, etc.) and/or static objects (e.g., buildings, road surface features, trees, signs, barriers, parked vehicles, etc.). In order to safely traverse a driving environment, an autonomous vehicle may include various components configured to detect objects and classify the detected objects. For example, a perception component of an autonomous vehicle may include any number of machine-learning (ML) models and/or components configured to detect and classify objects in the environment based on the radar data and/or other sensor data. For instance, the perception component may analyze the radar data to detect an object near the vehicle, and may evaluate various components of the radar data (e.g., doppler data, azimuth data, elevation data, and range data) to segment, classify, and track the objects, etc. A prediction component and/or a planning component of the autonomous vehicle may use the output of the object detection and classification components to determine a driving path for the vehicle relative to the objects in the environment. Any of the various vehicle-based components described herein may use one or more ML models and/or heuristics-based components to perform the respective sensor data analysis and driving functionality described herein.

In some examples, a radar device may be designed to generate a plurality of individual radar points, in which each radar point includes multiple radar data components (or parameters). The different radar data components of a radar point may include, for instance, a range (or distance-to-target) data value, an elevation data value, an azimuth data value, a doppler data value, etc. A radar detector (or radar data analyzer) associated with the radar device may use the combination of the data components to determine clusters (e.g., subsets) of radar points likely to be associated with the same object in the environment. For instance, a subset of radar points clustered within similar ranges of range values (distance-to-target), doppler values, azimuth values, and elevation values may be associated with the same object, and may be evaluated as a cluster to determine the object classification, size, pose, trajectory, etc. However, in some instances, radar devices may provide inaccurate values for some or all data components (or parameters) of a radar point or cluster of points. For instance, inaccuracies in the azimuth values of radar points can be caused by the configuration and/or alignment of antennae within an aperture of the radar device. Radar device apertures may include any number of antennae designed to transmit and/or receive radio waves. The antennae may be spaced and positioned in a particular arrangement within the aperture based on the intended use and/or purpose of the radar device. For instance, certain radar devices may be designed to receive a high-resolution representation of certain radar data parameters (or components), which may be achieved by positioning the transmission and reception antennae in a particular arrangement.

In some instances, the antennae pattern (e.g., alignment of multiple antennae) of a radar device may cause inaccurate azimuth values for certain radar points in the resulting radar data, an anomaly referred to as azimuth ambiguities. Similar or identical ambiguities may occur for the elevation data component of the radar data, which also may depend on the antennae pattern/alignment of the radar device. Solutions used to address azimuth ambiguities (and/or elevation ambiguities) may include redesigning the antennae pattern of the radar device, changing the radar pulse repetition frequency, and/or clustering radar data in such a way that azimuth ambiguities are excluded from the subsequent radar data processing. For example, techniques of radar point clustering in 3D space may include applying one or more clustering algorithms on the raw radar data to determine subsets (or clusters) of radar points based on range values, doppler values, and azimuth values. However, when using radar point clustering in 3D space, radar points affected by azimuth ambiguities may be excluded from a radar point cluster of a detected object, or may be including in a cluster associated with a different object, due to the inaccurate azimuth values of the radar points. Additionally, when using radar point clustering in 3D space, associated groupings of multipath radar points may be incorrectly identified and processed as separate detected objects.

To address the technical problems of radar data inaccuracies caused by azimuth ambiguities in radar devices, the techniques described herein include radar object detection using multistage clustering. In some examples, a radar data detection and/or analysis system (which may be referred to as a "radar detector") may be configured to detect radar data inaccuracies caused by azimuth ambiguities and/or multipath detections by initially clustering the data based on range and doppler data components, and then analyzing the azimuth values of the cluster. As described below in more detail, the radar detector may determine one or more azimuth error ranges within which radar anomalies (e.g., inaccurate azimuth values) caused by azimuth ambiguities may be found. Depending on factors such as the design of the radar device (e.g., the alignment or configuration of the antennae pattern, the aperture type and size, the radar pulse frequency, etc.), and the location of the objects detected in the environment, azimuth ambiguities can cause radar anomalies in within certain, predictable ranges of azimuth values. When the radar detector detects a radar point within such an azimuth error range, the radar detector may determine that the radar point likely (but not necessarily) has an inaccurate azimuth value. In various examples, the radar detector may determine any number of different azimuth error ranges that can be used to identify radar anomalies. After clustering radar data based on range and/or doppler data values, the radar detector may determine a first azimuth range corresponding to a main lobe of a detected object, and then may determine one or more azimuth error ranges corresponding to the azimuth ranges of the predicted side lobes associated with the object detection. Radar points within the azimuth error ranges may represent radar anomalies having an inaccurate representation of the true azimuth value of the radar points.

In some examples, the radar detector also may be configured to modify the cluster (or subset) of radar points based on detecting one or more radar point azimuth values within the azimuth error range(s). For example, based on determining that an azimuth value of a radar point is within an azimuth error range, the radar detector may modify the radar point (and/or other radar points in the cluster) using various techniques. Such techniques may include, but are not limited to, removing the radar point from the radar point cluster, modifying the inaccurate azimuth value of the radar point caused by the azimuth ambiguity to reflect the true azimuth value of the point, and/or assigning a lower confidence value to the radar point that can be during subsequent processing of the radar data. After modifying the clusters/subsets of radar points to correct or mitigate incorrect azimuth values based on the azimuth ambiguities, the radar detector may provide the modified subsets to additional downstream radar data analysis components, such as perception, prediction, and/or planning components, etc.

As illustrated by these examples, the techniques described herein can improve the functioning, safety, and efficiency of autonomous and semi-autonomous vehicles operating in various driving environments. The use of the multistage clustering techniques described herein may allow the vehicle to more efficiently and accurately detect radar data anomalies (e.g., azimuth ambiguities, elevation ambiguities, multipath detections, etc.) within the radar data captured by the radar devices on the vehicle. The radar detector may improve vehicle safety and driving efficiency by improving the accuracy of radar azimuth data and/or elevation data, and the improved radar data parameters can be used to determine a more accurate representation of a vehicle's surrounding environment and to perform safe and efficient driving maneuvers within the environment.

The techniques described herein also may reduce the processing load and/or memory overhead required by the vehicle to analyze the radar data of the environment. By identifying individual radar points and/or clusters of radar points affected by azimuth ambiguities, the radar detector may quickly remove or mitigate anomalies such as multiple detections and ghost image detections caused by the azimuth ambiguities. Thus, these techniques may reduce the number of radar point clusters that are provided to the downstream components (e.g., perception, prediction, planning, etc.), as well as improving the quality of the radar point clusters provided. These techniques can also reduce the amount of radar data processing time and overhead, without reducing the radar data accuracy (or by minimizing any reduction of accuracy) of detecting radar parameter anomalies, which can reduce the latency of processing components. Reducing latency can improve safety outcomes and/or comfort levels by controlling an autonomous vehicle, for example, by altering the vehicle trajectory or performing other driving maneuvers safely in the environment.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may provide an indication of whether it is safe to perform various maneuvers. In other examples, any or all of the techniques described herein may be implemented in other machine vison systems, such as security systems, object inspection and/or quality assurance systems, environment monitoring systems, etc. Moreover, even though the vehicles described herein are depicted as land vehicles, in other examples such vehicles may be aircraft, spacecraft, watercraft, and/or the like.

FIG. 1 is a pictorial flow diagram illustrating an example process 100 for receiving and modifying radar data using multistage clustering to detect azimuth values within an azimuth error range. Some or all of the operations in process 100 may be performed by a radar detector 102 configured to receive, analyze, and modify radar data based on the detection of azimuth ambiguities. In various examples, the radar detector 102 may be integrated into a radar device and/or into one or more sensor data analysis components such as a perception component, prediction component, planning component, and/or other components within an autonomous vehicle.

At operation 104, the radar detector 102 may receive radar data including a set of radar points captured by a radar device. In some examples, a vehicle may include multiple radar devices mounted at various locations and various angles relative to the vehicle, to capture radar data of a driving environment. The radar data may include any number of radar points representing individual radar detections from the driving environment. For example, box 106 illustrates an autonomous vehicle 108 navigating a driving environment and capturing radar data reflected from a plurality of objects. In this example, the vehicle 108 is approaching a junction including a first object 110 and a second object 112. As shown in box 106, the first object 110 may be a vehicle, and the second object 112 may be a pedestrian. In other examples, the radar data captured by a radar device may include any number of objects, each of which may be any type of dynamic or static object. In this example, the first object 110 is shown as being at a further distance from the vehicle 108 than is the second object 112. In other examples, there may be more or less objects at various distances from the vehicle 108.

As shown in box 106, the radar detector 102 may receive an initial set of radar points reflected from a number of objects in the driving environment. The radar points received by the radar detector 102 may correspond to radio waves that have reflected off of the first object 110 and/or the second object 112. In some instances, the locations and attributes of the first object 110 and second object 112 (e.g., size, material, reflectivity, etc.) may cause the set of radar points to be densely clustered at locations on or around the objects. For instance, the first object 110 and second object 112 are each shown as having an associated radar point cluster, each cluster including a number of radar points having similar range values, azimuth values, doppler values, and/or elevation values that correspond to the range, azimuth, velocity, and height of the respective objects in the environment.

However, as shown in this example, certain radar points caused by the detections of the first object 110 and second object 112 may have incorrect azimuth values, and thus may be located distant from their respective objects in the top-down representation of the environment. In this example, radar points 114 are a relatively small set (e.g., one or more) additional radar points reflected by the first object 110, for which the azimuth values are incorrect and separated from the primary and accurate radar point cluster for the first object 110. Similarly, radar points 116 are another small set of radar points reflected by the second object 112, for which the azimuth values are incorrect and separated from the primary and accurate radar point cluster for the second object 112. As discussed above, the incorrect azimuth values of radar points 114 and radar points 116 may be caused by azimuth ambiguities of the radar device. Such azimuth ambiguities may be caused by the radar device inaccurately estimating the azimuth values of radar return signals, based on the antennae alignment and/or configuration of the radar device used to capture the radar data.

At operation 118, the radar detector 102 may determine one or more clusters (or subsets) of radar points based on the range data and the doppler data associated with the set of radar points received in operation 104. As described above, depending on the type of radar device, each radar point may include a combination of radar data components (or parameters), such as doppler data, azimuth data, elevation data, range data, etc. In this example, box 120 illustrates a graph of radar points clustered based on range data and doppler data. The radar point graph shown in box 120 may correspond to the same or similar radar data of the environment shown in box 106. In this example, the radar detector 102 may use a clustering algorithm to cluster the initial set of radar points received in operation 104, based on the range values and doppler values of the initial radar points. For instance, the radar detector 102 may determine a cluster of radar points as the subset of points having doppler values and/or range values within a threshold range from one another, and/or clustering based on shortest distances within a two-dimensional range and doppler vector space. In various other examples, the radar detector 102 may use any combination of different clustering techniques to cluster radar points based on range and/or doppler data values.

As shown in this example, the radar detector 102 has determined a first cluster 122 of radar points and a second cluster 124 of radar points. The first cluster 122 and the second cluster 124 may be representative of a number of radar object detections in the driving environment. As shown, these clusters may include the subset of radar points determined to have similar ranges and/or similar doppler values relative to the vehicle 108. Accordingly, each cluster of radar points determined in operation 118 may correspond to a single object detected in the physical environment. In this example, the first cluster 122 may include the radar points reflected from the first object 110, and the second cluster 124 may include the radar points reflected from the second object 112. In this example, the first object 110 is at a further distance and may be traveling at a faster speed as compared to the second object 112.

Because the radar detector 102 in this example clusters radar points based on range and doppler, the resulting radar point clusters may include any radars point having inaccurate azimuth values caused by azimuth ambiguities. For instance, the radar points in the first cluster 122 may include the radar points associated with the first object 110 in the top-down view rendered in box 106, as well as the additional radar points 114 that are also associated with the first object 110 but have incorrect azimuth values caused by azimuth ambiguities. Similarly, the radar points in the second cluster 124 may include the radar points associated with the second object 112 in the top-down view rendered in box 106, as well as the additional radar points 116 that are also associated with the second object 112 but have incorrect azimuth values.

At operation 126, the radar detector 102 may analyze the azimuths of the radar point clusters determined in operation 118. In particular, in this example, the radar detector 102 may identify one or more radar points having azimuth values within one or more azimuth error ranges (which also may be referred to as error bands) corresponding to potential azimuth ambiguities. In some examples, the radar detector 102 may separately analyze the azimuth data for each determined cluster of radar points. For each determined radar point cluster, the radar detector 102 may separately determine one or more azimuth error ranges. As described above, the azimuth ambiguities may be caused by the antennae pattern of the radar device from which the radar data was received, and the azimuth error ranges may be determined based on the azimuth ambiguities and the actual range of azimuth values corresponding to the objection. For example, box 128 depicts a graph of radar points corresponding to the first cluster 122 of radar points associated with the first object 110. In this example, the graph shown in box 128 depicts the azimuth values for each radar point in the first cluster 122. In this example, a first subset 130 of the radar points include azimuth values at or near +45 degrees. A second subset 132 of the radar points may include azimuth values around −45 degrees. It can be understood from the context of this disclosure that this example is illustrative and non-limiting, and that the first subset 130 and the second subset 132 may include more or less radar points, and may represent azimuth values within various different ranges.

In some examples, the radar detector 102 may analyze the azimuth values of a cluster of radar points that have been clustered based on range and/or doppler, to determine a number of distinct azimuth ranges. Within a range-doppler cluster, each radar point may represent a radar return signal that reflected off of a detected object and has an accurate azimuth value for the object, a radar return signal that reflected off of the same object but has an inaccurate azimuth value due to azimuth ambiguities, or a radar return signal that reflected off of something other than the object, such as a different object or the background road surface of the environment, etc. The radar detector 102 may analyze the azimuth values of a range-doppler cluster, and may determine different azimuth ranges corresponding to these different classifications of radar points. For instance, the radar detector 102 may determine a first (or primary) azimuth range to identify radar points reflected off of an object with generally accurate azimuth values, corresponding to the main lobe of the object detection. One or more additional azimuth ranges, referred to as azimuth error ranges (or bands), may be determined based on the primary azimuth range of the object (e.g., the arrival angle of the return radar single reflected from the object) and the antennae pattern of the radar device. The azimuth error ranges may correspond to the azimuth ranges in which it is most likely that an azimuth inaccuracy due to an azimuth ambiguity may be found (e.g., the side lobes of the object detection). Multiple azimuth error ranges may be determined in some cases, including azimuth error ranges on both sides of the primary azimuth range of the object detection and/or azimuth error ranges that decrease in size as they move further away from the primary azimuth range. In some cases, each azimuth error range may be a uniform range (e.g., a uniform number of degrees), while in other cases, certain azimuth error ranges may be larger or smaller than other azimuth error ranges. In some instances, the number and/or pattern of azimuth error ranges may be based on the predicted side lobe pattern associated with the object detection.

In some examples, the radar detector 202 (and/or one or more separate computing devices) may determine the number and size of the azimuth error bands and/or elevation errors bands, based on a combination of the antenna configuration of the radar device (e.g., the spacing between sensor elements in the antenna array of the radar device) and the arrival angle of the radar return signals. For instance, azimuth error bands may be determined based on the spacing of the sensor elements in a first direction (e.g., corresponding to the x-direction in the environment) and elevation error bands may be determined based on the spacing of the sensor elements in a second direction (e.g., corresponding to the y-direction in the environment). In some examples, sparse antenna arrays may provide larger apertures and higher degrees of freedom than arrays with more densely distributed sensor elements. Although sparse arrays provide a number of advantages, they also may be susceptible to azimuth and/or elevation ambiguities due to the larger spacing of sensor elements relative to the wavelength of the transmitted wave (e.g., resulting in a phase difference between sensor elements). As a result, a sparse antenna array may have a greater number of azimuth error bands and/or elevation error bands, and/or may have larger error bands (e.g., in terms of width on the azimuth axis and/or elevation axis).

In addition to the primary azimuth range and the one or more azimuth error ranges for the object detection, a number of remaining azimuth ranges may be determined by the radar detector 102 in operation 126. These remaining azimuth ranges may include the ranges of azimuth values that do not fall within the primary azimuth range or any of the azimuth error ranges, and may include the azimuth ranges between the primary azimuth range and an azimuth error range, between two different azimuth error ranges, and/or beyond the azimuth error range that is furthest away from the primary azimuth range. As noted above, radar data points within these remaining azimuth ranges indicate that the radar return signal of the radar point reflected off of something other than the object, such as a different object or the background road surface of the environment, etc.

In some examples, the radar detector 102 may perform a second stage of clustering algorithms and/or techniques to determine the primary azimuth range for an object detection. During such clustering, a clustering algorithm can be executed to determine a subset of the radar point cluster having densely packed azimuth values (e.g., a threshold number of radar points within a particular azimuth range) indicating an object detection. In some instances, the radar detector 102 may use additional radar data analysis techniques, including object segmentation and/or classification, and/or analysis of additional sensor data modalities (e.g., image data, lidar data, sonar data, map data, etc.) to the determine the primary azimuth range for the object detection. As shown in box 128, a first subset 130 of radar points may include the radar points determined by the radar detector 102 (e.g., using a clustering algorithm) as corresponding to the object 110. In this example, a second subset 132 of radar points may include the radar points determined by the radar detector 102 as corresponding to an azimuth error range, indicating that the radar points are also associated with (e.g., reflected by) the object 110 but may have inaccurate azimuth values due to azimuth ambiguities.

At operation 134, the radar detector 102 may modify the cluster of radar points determined in operation 118, based at least in part on determining that a radar point is within one of the azimuth error ranges in operation 126. In some examples, the radar detector 102 may modify the cluster of radar points by removing or modifying any radar points determined to be within an azimuth error range. For instance, box 136 shows an example in which the radar detector 102 has modified the second subset 132 of radar points which were identified in operation 126 as being within an azimuth error range. In this example, the radar detector 102 may modify the azimuth values of the second subset 132 of radar points, by determining the accurate azimuth values that the points represent on the first object 110, and changing the azimuth values from the inaccurate values to the accurate values. As shown in box 136, the second subset 132 of radar points has been modified to adjust the azimuth values from an azimuth error range (e.g., a side lobe) into the primary azimuth range 138 (e.g., a main lobe) of the object detection.

The radar points within an azimuth error range, such as the second subset 132 of radar points, may be referred to as ambiguous radar points, because they may represent radar points reflected off of an object 110 with inaccurate azimuth values due to azimuth ambiguities of the radar device, or they might not represent radar points reflected off of the object 110 (e.g., radar points reflected off of another object or the background of the environment). In this example, the ambiguous radar points in the second subset 132 are determined to be associated with the object 110, and thus the radar detector 102 has modified the azimuth values of the radar points into the primary azimuth range 138. Additionally or alternatively, the radar detector 102 may remove the ambiguous radar points and/or may adjust a confidence level associated with the ambiguous radar points to indicate an increased likelihood that the radar points have inaccurate azimuth values due to azimuth ambiguities.

Additionally, although the example in FIG. 1 describes performing a multistage clustering technique and modifying radar points that fall within an azimuth error range, in other examples, similar or identical multistage clustering techniques may be performed using elevation error ranges (or bands). For instance, along with azimuth ambiguities, the antennae pattern of a radar device may additionally or alternatively cause elevation ambiguities, that is, inaccurate elevation values for certain radar points. Using similar or identical techniques to those described herein for azimuth, the radar detector 102 may determine an initial clustering of radar points based on range and doppler data, and then may compare the elevation values of the radar points in the cluster to elevation error ranges. When determining radar points that have elevation values within an elevation error range, the radar detector 102 may modify the radar point cluster. For instance, as described above with respect to azimuth, the radar detector 102 may correct the elevation values of the radar points within an elevation error range, remove the radar points from the cluster, and/or modify a confidence level associated with radar points.

Further, although the example in FIG. 1 describes multistage clustering in which azimuth error ranges are determined based on azimuth ambiguities caused by the antenna alignment of the radar device, in other examples, similar or identical multistage clustering techniques can be performed in which azimuth error ranges are determined based on an analysis of the multipath detections associated with the radar point cluster. For instance, the radar detector 102 may analyze the azimuth data of the radar point cluster to identify a first object detection (e.g., radar points reflected directly from an object) and a second multipath detection of the same object (e.g., radar points reflected indirectly along a different path). In such examples, the radar detector 102 may determine a primary azimuth range associated with the first object detection, and an azimuth error range corresponding to the azimuth values of the multipath detection. When determining radar points that have azimuth values within the azimuth error range of a multipath detection, the radar detector 102 may modify/correct the azimuth values of the radar points, remove the radar points from the cluster, and/or modify a confidence level associated with the radar points.

Figure 2:
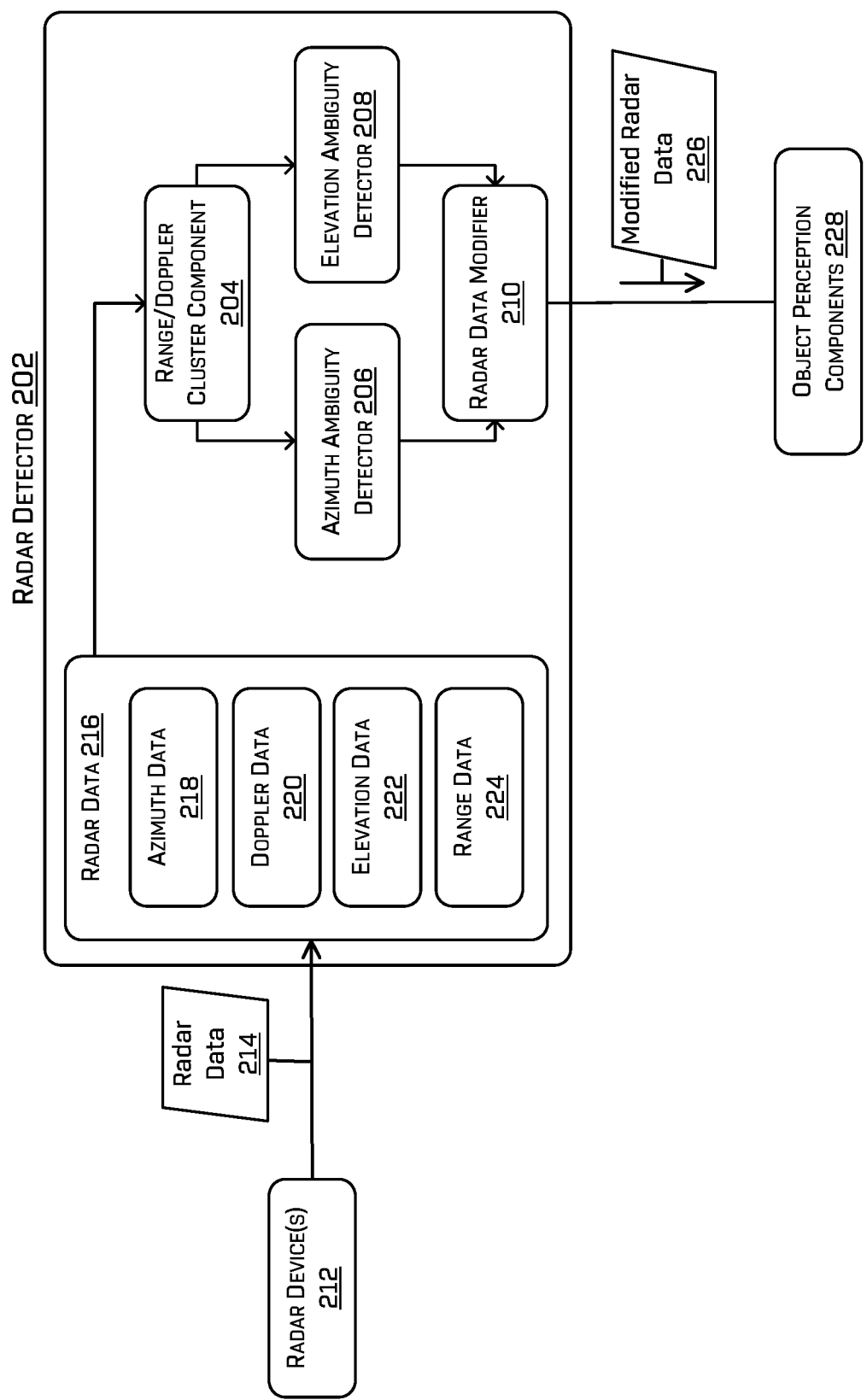
FIG. 2 illustrates an example computing system including a radar detector configured to modify radar data based on detected anomalies or invalid radar points, in accordance with one or more examples of the disclosure.

FIG. 2 illustrates an example computing system including a radar detector 202 configured to modify radar data based on the detection of data anomalies (e.g., azimuth ambiguities, multipath detections, etc.). In some examples, the radar detector 202 may be similar or identical to the radar detector 102 described above, or in any other examples herein. As noted above, in some cases the radar detector 202 may be implemented within or otherwise associated with a perception component, prediction component, and/or planning component of an autonomous vehicle. In some examples, the radar detector 202 may include various components, described below, configured to perform different functionalities of a multistage clustering technique for analyzing and modifying radar data. For instance, the radar detector 202 may include a range and doppler cluster component 204 configured to cluster a set of radar points based on the range data and doppler data of the set of radar points. The radar detector 202 also may include an azimuth ambiguity detector 206 configured to detect azimuth values of radar points that fall within an azimuth error range, an elevation ambiguity detector 208 configured to detect elevation values of radar points that fall within an elevation error range, and/or a radar data modifier 210 configured to modify the clusters of radar points.

In some examples, the radar detector 202 may receive radar data from one or more radar device(s) 212 within (or otherwise associated with) an autonomous vehicle. Different radar device(s) 212 may be mounted or installed at different locations on the autonomous vehicle, and may include various types of radar devices providing various elements (or parameters) of radar data 214 to the radar detector 202. As shown in this example, the radar detector 202 may include a radar data component 216 configured to receive, store, and/or synchronize radar data from one or more radar device(s) 212. The radar data component 216 may include various subcomponents, described below, to receive, store, synchronize, and/or analyze particular radar data received from the radar device(s) 212. A radar device may capture any number of parameters of radar data component 216 from any number of radar devices 212. As shown in FIG. 2, the illustrated subcomponents are some of the possible radar data parameters that a radar device may capture. In some examples, a radar device may capture more or less than the illustrated radar data components shown in FIG. 2.

In this example, the radar data component 216 may include one or more subcomponents associated with different radar data components (or parameters). As illustrated in FIG. 2, the radar device(s) 212 may capture radar data 214 including an azimuth radar data subcomponent 218, doppler radar data subcomponent 220, elevation radar data subcomponent 222, and range radar data subcomponent 224. In some examples, depending on the type of radar device, the radar device may capture additional or fewer radar data parameters. In this example, azimuth radar data subcomponent 218 may be used to determine, store, and/or synchronize a direction (or bearing) of detected objects relative to the radar device(s) 212. The doppler radar data subcomponent 220 may be used to determine, store, and/or synchronize a radial velocity of detected objects relative to the radar device 212. The elevation radar data subcomponent 222 may be used to determine, store, and/or synchronize the height of detected objects based on the radar data 214. The radar range data subcomponent 224 may be used to receive, store, and/or synchronize the distance of detected objects relative to the radar device 212.

In some examples, the radar detector 202 may include a range and doppler cluster component (or range/doppler cluster component 204), configured to determine radar point clusters based on the range data and doppler data of an initial set of radar points. The range/doppler cluster component 204 may receive a set of radar points including one or more radar parameters (e.g., subcomponents) from the radar data component 216. In some examples, the range/doppler cluster component 204 may use various clustering algorithms and/or other data clustering techniques to determine subsets (or radar point clusters) from the initial set of radar points. In such examples, the range/doppler cluster component 204 may cluster the set of radar points based on radar range data subcomponent 224 and the doppler radar data subcomponent 220.

In some examples, the radar detector 202 may include an azimuth ambiguity detector 206 configured to detect azimuth values of radar points that fall within one or more azimuth error ranges. The azimuth ambiguity detector 206 may determine a range within which radar detections indicative of an object may be present. Additionally, the azimuth ambiguity detector 206 may determine a number of ranges within which radar points are potentially or more likely to be ambiguous radar points. In such examples, the azimuth ambiguity detector 206 may determine azimuth error ranges within which radar points have a greater likelihood of being ambiguous radar points caused by azimuth ambiguities and/or multipath detections. Depending on how the radar device 212 antennae are positioned, and the azimuth location and range of a valid object detection, the azimuth ambiguity detector may predict azimuth ranges within which potential ambiguous radar points may be present. In some examples, the azimuth ambiguity detector 206 may determine that one or more azimuth values of radar points fall within one or more azimuth error ranges. In such examples, the azimuth ambiguity detector 206 may determine that such radar points are azimuth ambiguities.

Additionally or alternatively, the radar detector 202 may include an elevation ambiguity detector 208 configured to detect elevation values of radar points that fall within one or more elevation error ranges. Similar to the azimuth ambiguity detector 206, the elevation ambiguity detector 208 may determine a range within which radar detections representative of an object may be present. Further, the elevation ambiguity detector 208 may determine one or more elevation error ranges, within which radar points have a greater likelihood of being ambiguous radar points caused by elevation ambiguities. In some examples, the elevation ambiguity detector 208 may determine that a number of elevation values fall within one or more elevation error ranges. In such examples, the elevation ambiguity detector 208 may determine that such elevation values may be elevation ambiguities.

In some examples, the radar detector 202 may include a radar data modifier 210 configured to modify subsets of radar data 214. The radar data modifier 210 may receive subsets of radar points (e.g., radar data 214) including any azimuth ambiguities (e.g., radar points within azimuth error ranges) and/or elevation ambiguities (e.g., radar points within elevation error ranges). In such examples, the radar data modifier 210 may modify the subset of radar points in a variety of ways. For instance, the radar data modifier 210 may modify the individual radar points by assigning a lower confidence level to the radar point including the azimuth ambiguity, removing the radar point with the azimuth ambiguity from the subset of radar points, and/or modifying the azimuth value (or elevation value) associated with the radar point with the azimuth ambiguity (or elevation ambiguity), or any other modifying action.

As shown in this example, the radar data modifier 210 may send the modified radar data 226 to perception components 228 for further processing. In such examples, based on the radar data modifier 210 having modified the subset of radar points, the radar data modifier 210 may send the modified radar data 226 to the perception components 228.

Figure 3:
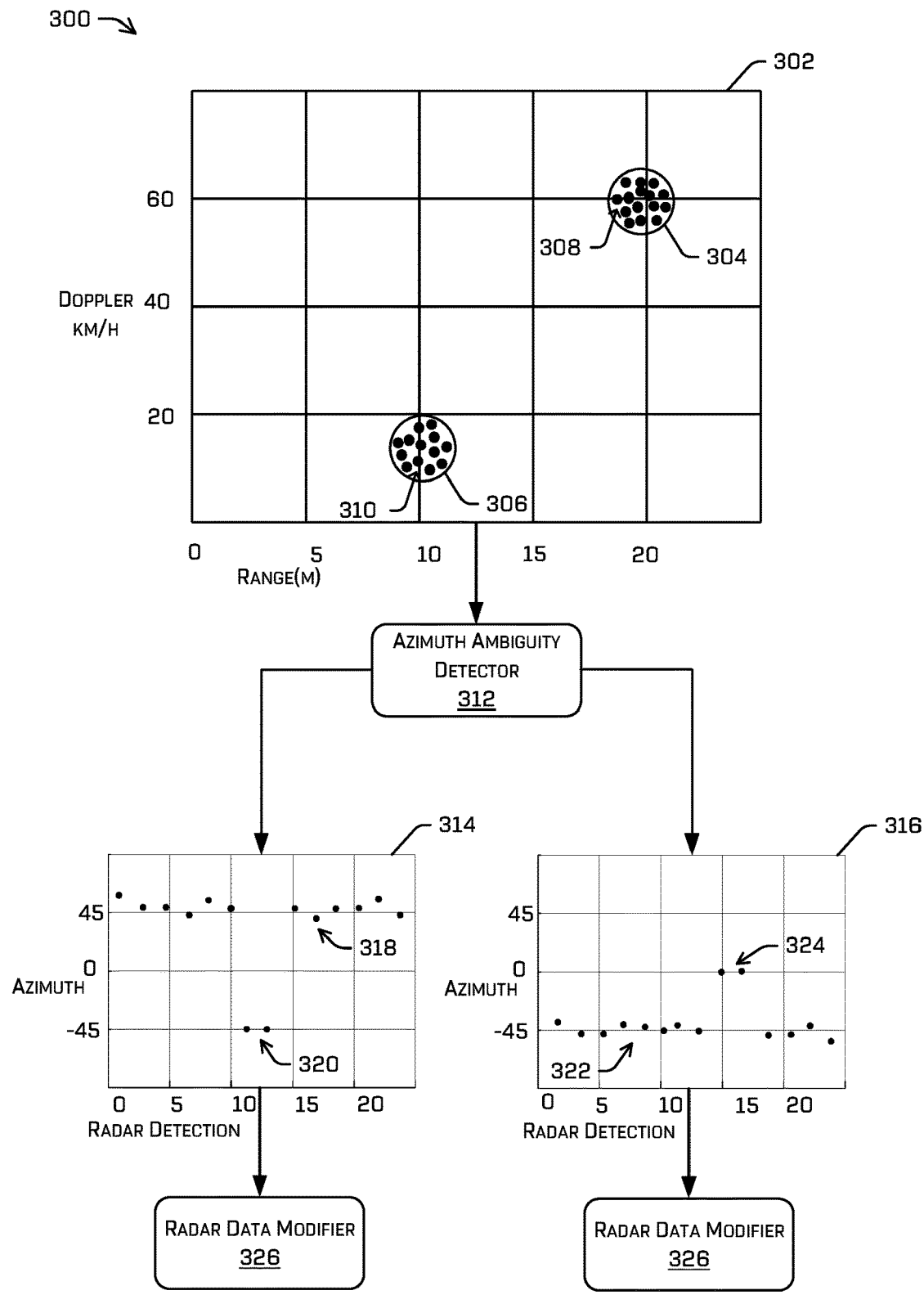
FIG. 3 illustrates an example process of analyzing and modifying radar data based on azimuth ambiguity detection, in accordance with one or more examples of the disclosure.

FIG. 3 is a pictorial flow diagram 300 illustrating a technique for determining a subset of radar data based on range data and doppler data, analyzing azimuth values of radar points in the subset of radar points, and modifying the subset of radar points.

As shown in this example, the radar detector 102 may receive a radar point graph 302. The radar point graph 302 may be similar or identical to the radar point graph of FIG. 1. As described above, the radar point graph 302 may be graphed based on range data and doppler data of a set of radar points. In some examples, the radar point graph 302 may include one or more subsets of radar points. As shown in this example, the radar point graph 302 may include a first subset 304 of radar points 308 and a second subset 306 of radar points. The first subset 304 may include a number of radar points 308. In some examples, the first subset 304 may be illustrative of the radar detections from the first object 110 of FIG. 1. In such examples, the second subset 306 may include radar points 310 which may be illustrative of the radar detections from the second object 112 of FIG. 1. As shown in the radar point graph 302, the first subset 304 is shown at a range of around 20 meters (e.g., from the radar sensor), and a doppler of around 60 km/h (e.g., relative to the radar sensor). Further, the second subset 306 is shown at a range of around 10 meters, and a doppler of around 15 km/h.

In some examples, the first subset 304 of radar points 308 and the second subset 306 of radar points 310 may be sent to an azimuth ambiguity detector 312. As described above, the azimuth ambiguity detector 312 may be configured to detect azimuth values of radar points that fall within an azimuth error range. In some examples, the azimuth ambiguity detector 312 may analyze a first azimuth radar graph 314 and a second azimuth radar graph 316. The first azimuth radar graph 314 may be illustrative of the azimuth values of the radar points 308 within the first subset 304, and the second azimuth radar graph 316 may be illustrative of the azimuth values of the radar points 310 within the second subset 306.

In some examples, the azimuth ambiguity detector 312 may determine that the first azimuth radar graph 314 may include a first azimuth cluster 318 and a second azimuth cluster 320. The first azimuth cluster 318 may be representative of radar points that have reflected from an object within a driving environment. The second azimuth cluster 320 may be representative of radar points that have azimuth ambiguities (e.g., the radar azimuth value was inaccurately estimated based on an alignment of the radar aperture antennae). In some examples, the azimuth ambiguity detector 312 may determine that the radar device includes azimuth error ranges every 45 degrees. In such examples, based on the object related radar points (e.g., the first azimuth cluster 318) having azimuth values around 45 degrees, the azimuth ambiguity detector 312 may determine an azimuth error range around 0 degrees and around −45 degrees. The azimuth ambiguity detector 312 may determine whether one or more radar points have azimuth values within the azimuth error range. In this example, the azimuth ambiguity detector 312 may determine that the second azimuth cluster 320 (e.g., which includes radar points with azimuth values around −45 degrees) may be within the azimuth error range.

In some examples, the azimuth ambiguity detector 312 may determine that the second azimuth radar graph 316 may include a first azimuth cluster 322 and a second azimuth cluster 324. The first azimuth cluster 322 may be representative of radar points that have reflected from an object within a driving environment. The second azimuth cluster 320 may be representative of radar points that have azimuth ambiguities. As described above, the azimuth ambiguity detector 312 may determine that the radar device has azimuth error ranges every 45 degrees. In such examples, based on the object-related radar points (e.g., the first azimuth cluster 322) having azimuth values around −45 degrees, the azimuth ambiguity detector 312 may determine a first azimuth error range around 0 degrees and a second azimuth error range around 45 degrees. In this example, the azimuth ambiguity detector 312 may determine that the second azimuth cluster 324 (e.g., which includes radar points with azimuth values around 0 degrees) may be within the azimuth error range.

In some examples, the azimuth ambiguity detector 312 may send the first subset 304 of radar points 308 and the second subset 306 of radar points 310 to a radar data modifier 326. The radar data modifier 326 may be configured to modify the subsets (e.g., clusters) of radar points. In some examples, the radar data modifier 326 may process the first subset 304 and the second subset 306 in parallel.

The examples in FIG. 3 are not intended to be limiting. In other examples, the radar point graph 302 may include more or less subsets of radar points. Further, the subsets of the radar point graph 302 may be at any combination of range and doppler. In other examples, the azimuth values of the subset 306 of radar points and the subset 304 of radar points may be at any azimuth range and may or may not include azimuth ambiguities. In other examples, the radar device may include azimuth error ranges at varying degrees.

Figure 4:
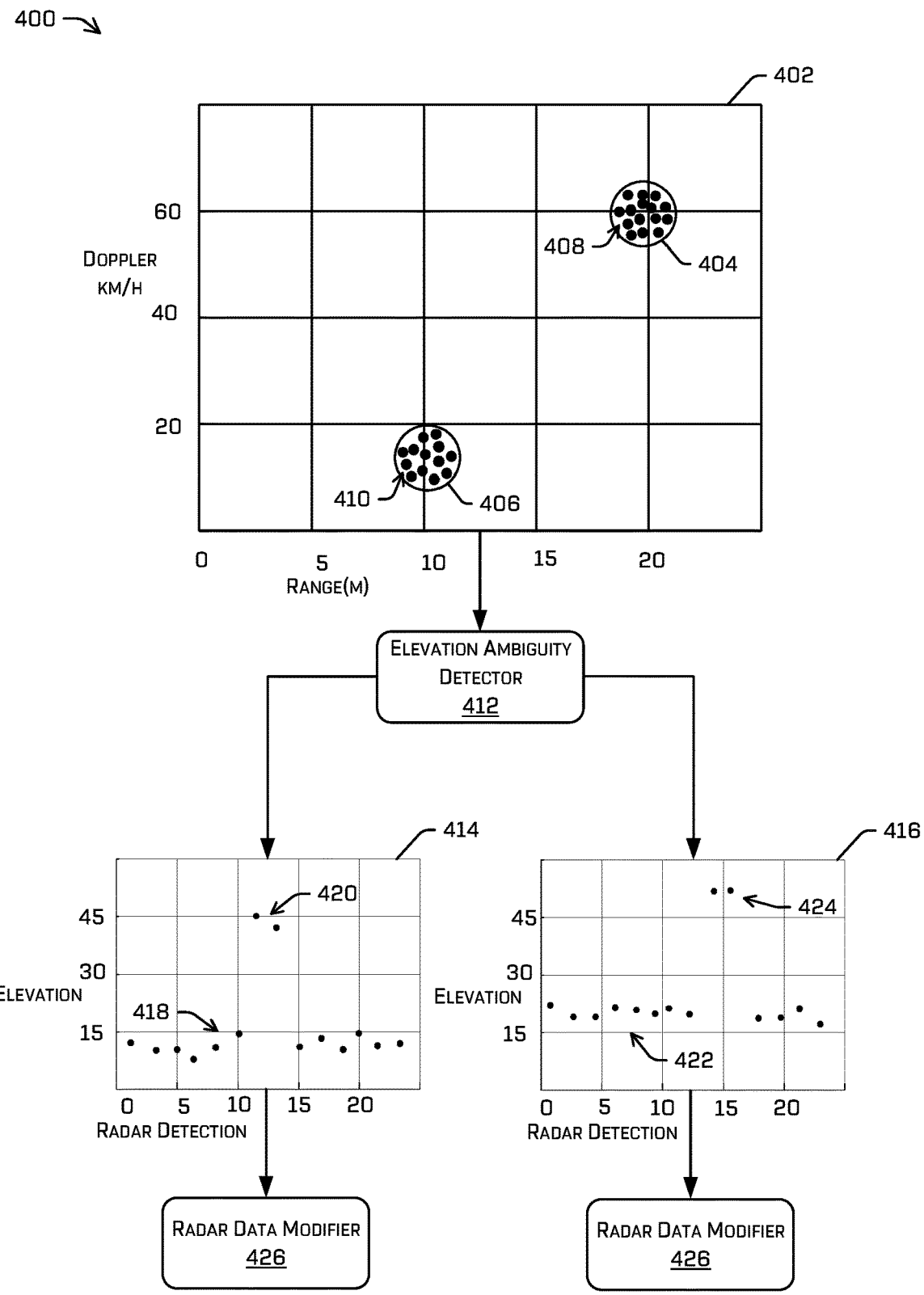
FIG. 4 is a pictorial flow diagram of an example process of determining a subset of radar data, analyzing elevation values of radar points in the subset of radar points, and modifying the subset of radar points, in accordance with one or more examples of the disclosure.

FIG. 4 is a pictorial flow diagram 400 illustrating an example technique of determining a subset of radar data based on range data and doppler data, analyzing elevation values of radar points in the subset of radar points, and modifying the subset of radar points.

In some examples, radar detector 102 may receive include a radar point graph 402. In some examples, the radar point graph 402 may be similar or identical to the radar point graph of FIGS. 1 and 3. As shown in this example, the radar point graph 402 may include a first subset 404 of radar points 408 and a second subset 406 of radar points 410. In some examples, the first subset 404 may be illustrative of the radar points from the first object 110 of FIG. 1. In such examples, the second subset 406 may include radar points 410 which may be illustrative of the radar points from the second object 112 of FIG. 1.

In some examples, the first subset 404 of radar points 408 and the second subset 406 of radar points 410 may be sent to an elevation ambiguity detector 412. As described above, the elevation ambiguity detector 412 may be configured to detect elevation values of radar points that fall within an elevation error range. In some examples, the elevation ambiguity detector 412 may analyze a first elevation radar graph 414 and a second elevation radar graph 416. The first elevation radar graph 414 may be illustrative of the elevation values of the radar points 408 within the first subset 404, and the second elevation radar graph 416 may be illustrative of the elevation values of the radar points 410 within the second subset 406 of radar points.

In some examples, the elevation ambiguity detector 412 may determine that the first elevation radar graph 414 may include a first elevation cluster 418 and a second elevation cluster 420. The first elevation cluster 418 may be representative of radar points that have reflected from an object within a driving environment. The second elevation cluster 420 may be representative of radar points that have elevation ambiguities (e.g., the radar elevation value was inaccurately estimated based on the alignment of the radar aperture antennae). In some examples, the elevation ambiguity detector 412 may determine that the radar device includes elevation error ranges every 15 degrees. In such examples, based on the object-related radar detections (e.g., the first elevation cluster 418) having elevation values around 15 degrees, the elevation ambiguity detector 412 may determine an elevation error range around 30 degrees and around 45 degrees. The elevation ambiguity detector 412 may determine whether one or more radar points have elevation values within the elevation error range. In this example, the elevation ambiguity detector 412 may determine that the second elevation cluster 420 (e.g., which includes radar points with elevation values around 45 degrees) may be within the elevation error range.

In some examples, the elevation ambiguity detector 412 may determine that the second elevation radar graph 416 may include a first elevation cluster 422 and a second elevation cluster 424. The first elevation cluster 422 may be representative of radar points that have reflected from an object within a driving environment. The second elevation cluster 420 may be representative of radar points that have elevation ambiguities. As described above, the elevation ambiguity detector 412 may determine that the radar device includes elevation error ranges every 15 degrees. In such examples, based on the object-related radar detections having elevation values around 20 degrees, the elevation ambiguity detector 412 may determine a first elevation error range around 35 degrees and a second elevation error range around 50 degrees. In this example, the elevation ambiguity detector 412 may determine that the second elevation cluster 424 (e.g., which includes radar points with elevation values around 50 degrees) may be within the azimuth error range.

In some examples, the elevation ambiguity detector 412 may send the first subset 404 of radar points 408 and the second subset 406 of radar points 410 to a radar data modifier 426. The radar data modifier 426 may be configured to modify the subsets (e.g., clusters) of radar points. In some examples, the radar data modifier 426 may process the first subset 404 and the second subset 406 in parallel.

The examples in FIG. 4 are not intended to be limiting. In other examples, the radar point graph 402 may include more or less subsets of radar points. Further, the subsets of the radar point graph 402 may be at any combination of range and doppler. In other examples, the elevation values of the subset 406 of radar points and the subset 404 of radar points may be at any elevation range and may or may not include elevation ambiguities. In other examples, the radar device may include elevation error ranges at varying degrees.

The examples described above in FIG. 3 and FIG. 4 respectively describe multistage clustering techniques in which the azimuth data of an initial radar cluster is analyzed in a second clustering stage (FIG. 3), and in which the elevation data of the initial radar cluster is analyzed in the second clustering stage (FIG. 4). As in these examples, different techniques may be implemented in which ambiguity ranges (or bands) and/or multipath detections are determined based on either the azimuth data or the elevation data. Additionally, in some examples, the radar detector 202 may be configured to concurrently analyze the azimuth and elevation data of the initial radar cluster. For instance, an error range (or band) may be an azimuth error range, elevation error range, or a combined azimuth-elevation error range. For combined azimuth-elevation error ranges, the radar detector 202 may perform a second clustering stage by clustering in a 2D azimuth and elevation space, and/or may compare both the azimuth value and the elevation value of each individual radar to the azimuth-elevation error range.

Figure 5:
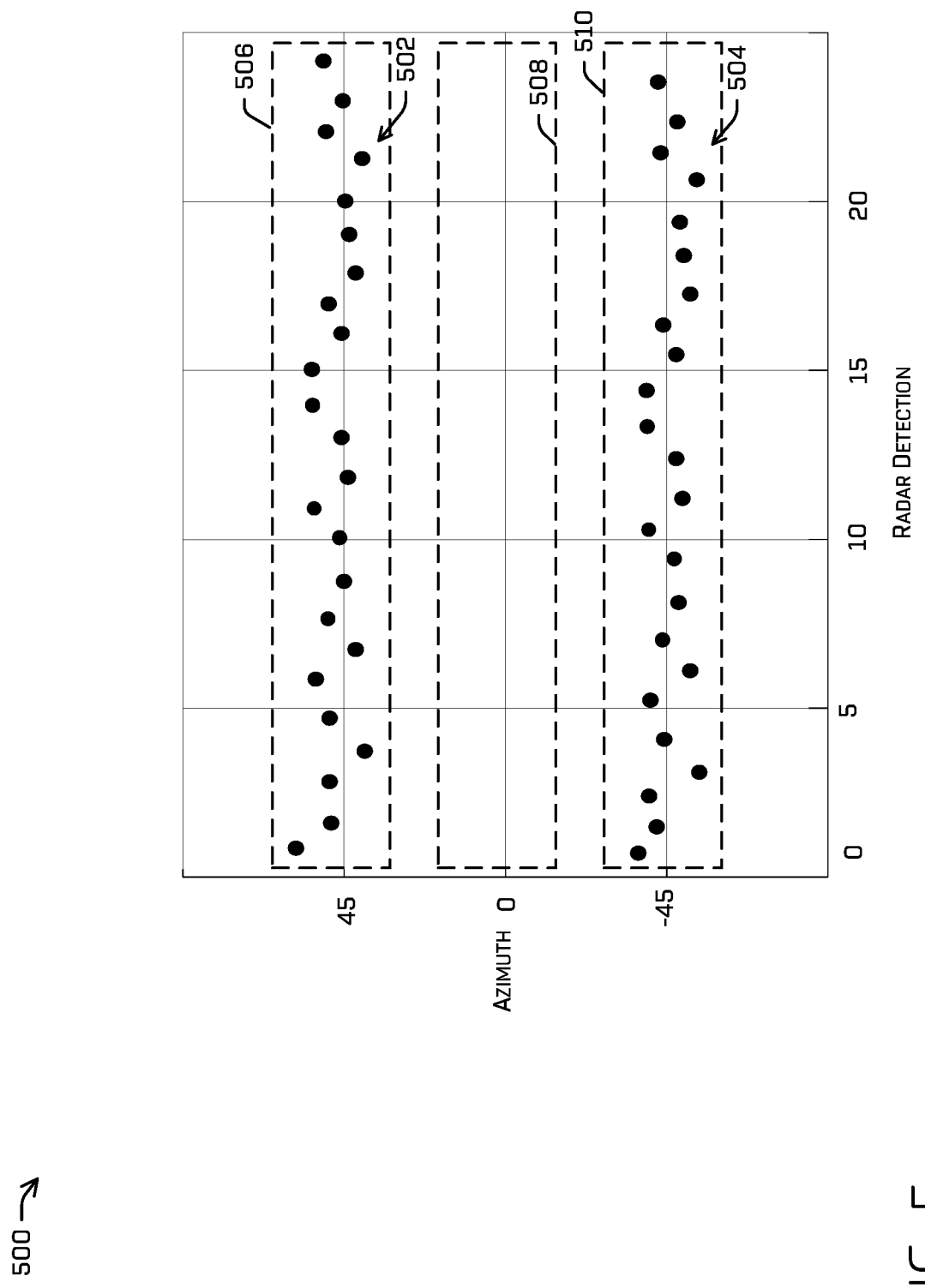
FIG. 5 depicts an example radar data graph showing azimuth data associated with a subset of radar points representative of multipath radar returns, in accordance with one or more examples of the disclosure.

FIG. 5 depicts an example radar data graph 500 showing azimuth data associated with a subset of radar points representative of multipath radar returns.

In some examples, the example radar data graph 500 may include a number of radar points graphed based on azimuth values of the radar points. In such examples, the example radar data graph 500 may represent radar data captured by one or more radar devices of a vehicle operating in an environment. A radar detector may determine subsets of radar points by clustering based on range data and doppler data of the set of radar points. In some examples, the radar detector may analyze each subset of radar points based on azimuth values of the radar points.

In some examples, the example radar data graph 500 may include a first cluster 502 of radar points and a second cluster 504 of radar points. The example radar data graph 500 may also include a number of ranges within which radar points may or may not be present. In some examples, the example radar data graph 500 may include a first range 506 within which the first cluster 502 of radar points may be present. In such examples, the first cluster 502 may be representative of radar points that have reflected from an object within an environment. In such examples, the example radar data graph 500 may include a second range 508 and a third range 510. The second range 508 and the third range 510 may be indicative of azimuth error ranges within which radar anomalies may be found. As shown in this example, the second cluster 504 of radar points may be present within the third range 510. Additionally, the azimuth ranges shown in this example, including the first range 506, the second range 508, and the third range 510 are not adjacent to one another. Rather, additional (unlabeled) azimuth ranges provide gaps between the accurate object detection radar points in the first range 506, and the azimuth error ranges defined by the second range 508 and the third range 510.

In some examples, the radar detector may determine whether a cluster of radar points may be indicative of multipath radar returns. Multipath fading occurs when a radar sensor transmits a radio wave and the reflected radio wave returns to the radar sensor from multiple paths, such as a first return path of a radar transmission corresponding to a direct reflection path from the object, and a second return path of the radar transmission corresponding to indirect path from the object that reflects off of a second object. For instance, multipath fading may occur when a radio wave reflects off a number of objects (e.g., guard rail, sign, vehicles, buildings, land, etc.) within a driving environment, and the radio wave returns to the radar device from a number of paths. In some examples, the radar detector may determine that a cluster of radar points is indicative of multipath reflection if there are more than one cluster of radar points that are symmetrical. Further, the radar detector may also determine whether a cluster of radar points is indicative of multipath reflection if a single radio wave transmission is responsible for more than one radar point (e.g., detection). As shown in the example radar data graph 500, the first cluster 502 may be symmetrical to the second cluster 504. In such examples, the radar detector may determine that the second cluster 504 may be indicative of multipath fading. In this example, the radar detector may modify the subset of radar points using methods described throughout the disclosure.

Figure 6:
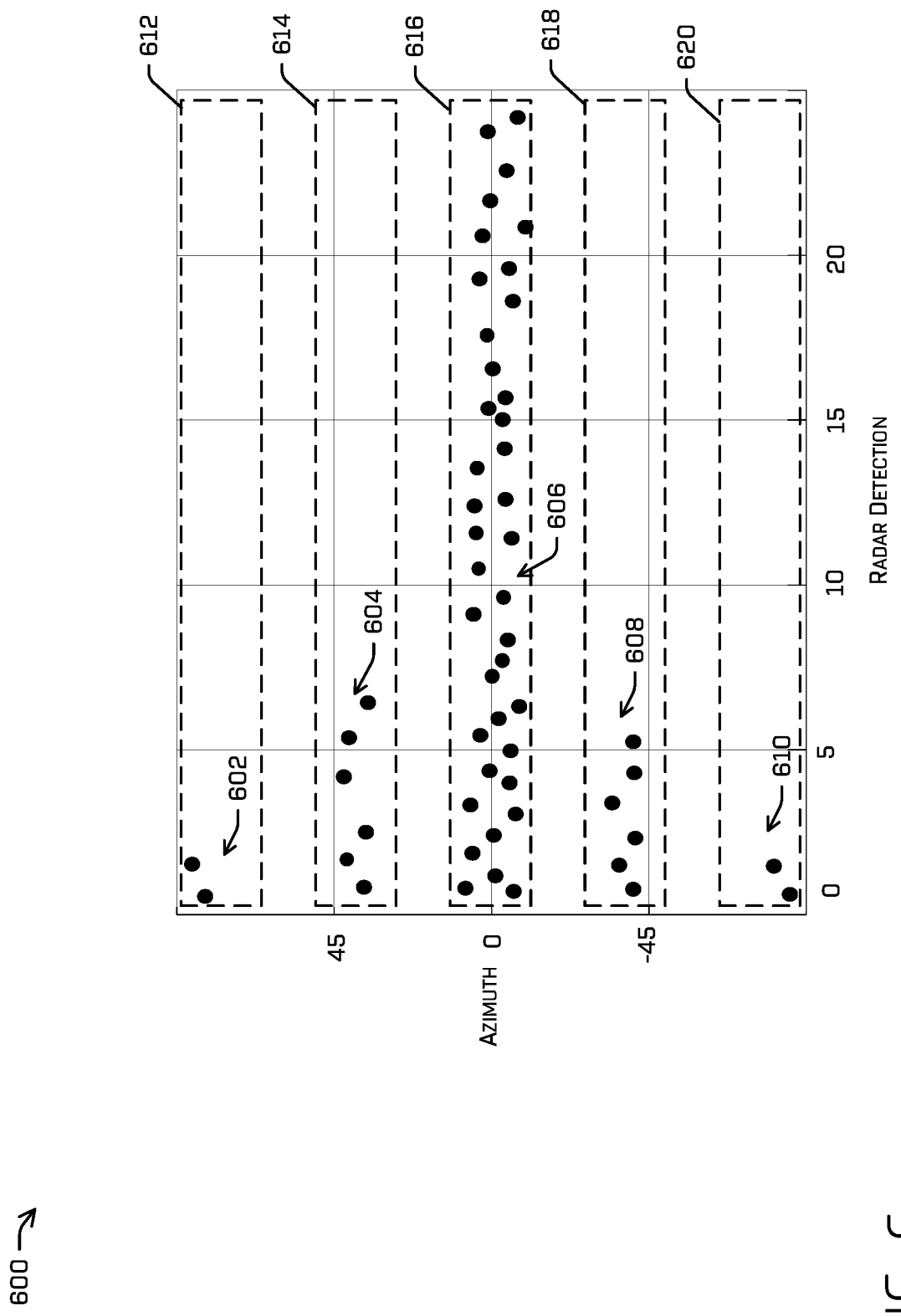
FIG. 6 depicts an example radar data graph showing azimuth data associated with a subset of radar points including radar anomalies, in accordance with one or more examples of the disclosure.

FIG. 6 depicts another example radar data graph 600 showing the azimuth data values for the radar points in a radar point cluster. In this example, the radar data graph 600 includes a first subset 602 of radar points, a second subset 604 of radar points, a third subset 606 of radar points, a fourth subset 608 of radar points, and a fifth subset 610 of radar points. However, this is not intended to be limiting, and the radar data graph 600 may include additional or fewer subsets of radar points with varying azimuth values in other examples. As shown in this example, the radar detector 102 has analyzed and classified the azimuth values of the radar data graph 600 into azimuth ranges, including a first azimuth range 612, a second azimuth range 614, a third azimuth range 616, a fourth azimuth range 618, and a fifth azimuth range 620. As shown in the radar data graph 600, the first subset 602 of radar points falls within the first azimuth range 612, the second subset 604 of radar points falls within the second azimuth range 614, the third subset 606 of radar points falls within the third azimuth range 616, the fourth subset 608 of radar points falls within the fourth azimuth range 618, and the fifth subset 610 of radar points falls within the fifth azimuth range 620. As in the above example, the azimuth ranges shown in this example are not adjacent to one another, but instead additional (unlabeled) azimuth ranges provide gaps between the accurate object detection radar points in the third azimuth range 616, and the additional azimuth error ranges shown in the radar data graph 600.

As shown in this example, the radar data graph 600 may illustrate radar points which may include a number of ambiguous radar points based on azimuth ambiguities, in which the ambiguous radar points fall into a pattern representing grating lobes. In some examples, the grating lobes may correspond to a cluster of azimuth values that may have reflected from an object within an environment. In such examples, grating lobes may include multiple subsets of radar points dispersed into higher or lower azimuth values. Further, the subsets of radar points may diminish in number the further the azimuth values are from the primary cluster of radar points having accurate azimuth values (e.g., an azimuth ambiguity is more likely to be slightly inaccurate than largely inaccurate). As shown in the radar data graph 600, the third subset 606 represents the accurate object detection, and separate subsets having higher and lower azimuth values representing the azimuth ambiguities in which the number of ambiguous radar points diminishes as the grating lobes move further away from the third subset 606. For instance, the second subset 604 and the fourth subset 608 may represent higher likelihood azimuth ambiguities and the first subset 602 and fifth subset 610 may represent lower likelihood azimuth ambiguities.

Although FIG. 6 depicts one example of azimuth error bands, it can be understood that any other configuration of the azimuth error bands may be determined in other examples. As noted above, the number, size (e.g., width) and location of azimuth error bands and elevation error bands may depend on the antenna configuration of the radar device and/or the arrival angle of radar return signals. Although in this example, the azimuth error bands are distributed evenly around the third azimuth range 616 (e.g., the accurate object detection band), with the more distant error bands having a lower likelihood of containing azimuth ambiguities, in other examples the error bands can be unevenly distributed and/or different distances apart from the azimuth range of the object detection. Further, in other examples the more distant error bands may have different sizes (e.g., smaller or larger widths) than the closer error bands, and more distant error bands can be equally likely or more likely to contain azimuth ambiguities in some cases.

Figure 7:
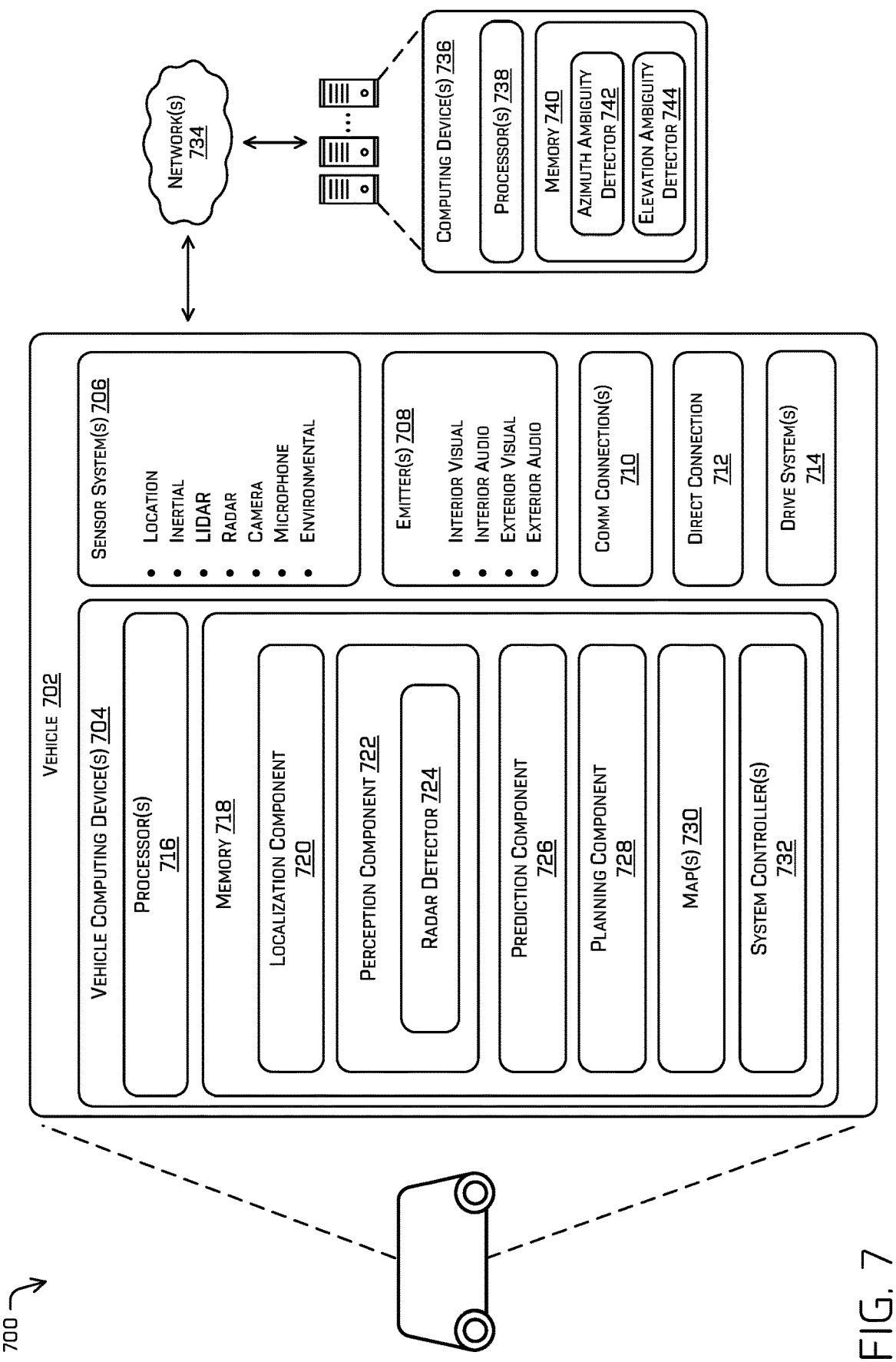
FIG. 7 depicts a block diagram of an example system for implementing various techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more communication connections 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having at least an image capture device (e.g., a camera-enabled smartphone). In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722 including a radar detector 724 one or more radar detector components, a prediction component 726, a planner component 728, one or more system controllers 732, and one or more maps 730 (or map data 730). Though depicted in FIG. 7 as residing in the memory 718 for illustrative purposes, it is contemplated that the localization component 720, the perception component 722 including the one or more radar detector 724, the prediction component 726, the planner component 728, system controller(s) 732, and/or the map(s) may additionally, or alternatively, be accessible to the vehicle 702 (e.g., stored on, or otherwise accessible by, memory remote from the vehicle 702, such as, for example, on memory 740 of one or more computing device 736). In some examples, the memory 740 may include an azimuth ambiguity detector 742 and an elevation ambiguity detector 744.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 730, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The radar detector 724 may be configured to modify, using one or more of the processes described herein, radar points based on multistage clustering. For example, the radar detector 724 may be configured to receive radar data associated with radar devices mounted to the vehicle 702 traversing a driving environment. Additionally, the radar detector 724 may be configured to cluster the radar detections based on range data and doppler data. The radar detector 724 may analyze individual clusters based on the azimuth values of each radar detection. In some examples, the radar detector 724 may determine that azimuth values or elevation values of a number of radar points fall within an azimuth error range or elevation error range. In such examples, based on an azimuth value or elevation value of a radar point falling within an azimuth error range or elevation error range, the radar detector 724 may modify the radar point.

The prediction component 726 may generate one or more probability maps representing prediction probabilities of possible locations of one or more objects in an environment. For example, the prediction component 726 may generate one or more probability maps for vehicles, pedestrians, animals, and the like within a threshold distance from the vehicle 702. In some instances, the prediction component 726 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 726 may generate predicted trajectories of objects (e.g., objects) in an environment. For example, the prediction component 726 may generate one or more predicted trajectories for objects within a threshold distance from the vehicle 702. In some examples, the prediction component 726 may measure a trace of an object and generate a trajectory for the object based on observed and predicted behavior.

In general, the planner component 728 may determine a path for the vehicle 702 to follow to traverse through an environment. For example, the planner component 728 may determine various routes and trajectories and various levels of detail. For example, the planner component 728 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 728 may generate an instruction for guiding the vehicle 702 along at least a portion of the route from the first location to the second location. In at least one example, the planner component 728 may determine how to guide the vehicle 702 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 728 may select a trajectory for the vehicle 702.

In other examples, the planner component 728 may alternatively, or additionally, use data from the localization component 720, the perception component 722, and/or the prediction component 726 to determine a path for the vehicle 702 to follow to traverse through an environment. For example, the planner component 728 may receive data (e.g., object data) from the localization component 720, the perception component 722, and/or the prediction component 726 regarding objects associated with an environment. In some examples, the planner component 728 receives data for relevant objects within the environment. Using this data, the planner component 728 may determine a route to travel from a first location (e.g., a current location) to a second location (e.g., a target location) to avoid objects in an environment. In at least some examples, such a planner component 728 may determine there is no such collision-free path and, in turn, provide a path that brings vehicle 702 to a safe stop avoiding all collisions and/or otherwise mitigating damage.

In at least one example, the vehicle computing device 704 may include one or more system controllers 732, which may be configured to control steering, propulsion, braking, safety, emitters, communication, and other systems of the vehicle 702. The system controller(s) 732 may communicate with and/or control corresponding systems of the drive system(s) 714 and/or other components of the vehicle 702.

The memory 718 may further include one or more maps 730 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 730. That is, the map(s) 730 may be used in connection with the localization component 720, the perception component 722, the prediction component 726, and/or the planner component 728 to determine a location of the vehicle 702, detect objects in an environment, generate routes, determine actions and/or trajectories to navigate within an environment.

In some examples, the one or more maps 730 may be stored on a remote computing device(s) (such as the computing device(s) 736) accessible via network(s) 734. In some examples, multiple maps 730 may be stored based on, for example, a characteristic (e.g., type of entity, time of day, day of week, season of the year, etc.). Storing multiple maps 730 may have similar memory requirements, but increase the speed at which data in a map may be accessed.

In some instances, aspects of some or all of the components discussed herein may include any models, techniques, and/or machine learned techniques. For example, in some instances, the components in the memory 718 (and the memory 740, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 734, to the one or more computing device(s) 736 at a particular frequency, after a lapse of a predetermined period of time, in near real-time, etc.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connections 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., computing device 736, other nearby vehicles, etc.) and/or one or more remote sensor system(s) for receiving sensor data. The communications connection(s) 710 also enable the vehicle 702 to communicate with a remote teleoperations computing device or other remote services.

The communications connection(s) 710 may include physical and/or logical interfaces for connecting the vehicle computing device 704 to another computing device or a network, such as network(s) 734. For example, the communications connection(s) 710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders)

to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the radar detector 724, the prediction component 726, the planner component 728, the one or more system controllers 732, and the one or more maps 730 may process sensor data, as described above, and may send their respective outputs, over the one or more network(s) 734, to the computing device(s) 736. In at least one example, the localization component 720, the perception component 722, the radar detector 724, the prediction component 726, the planner component 728, the one or more system controllers 732, and the one or more maps 730 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 734. In some examples, the vehicle 702 may receive sensor data from the computing device(s) 736 and/or remote sensor system(s) via the network(s) 734. The sensor data may include raw sensor data and/or processed sensor data and/or representations of sensor data. In some examples, the sensor data (raw or processed) may be sent and/or received as one or more log files.

The computing device(s) 736 may include processor(s) 738 and a memory 740, which may include an azimuth ambiguity detector 742 and an elevation ambiguity detector 744. In some examples, the memory 740 may store one or more of components that are similar to the component(s) stored in the memory 718 of the vehicle 702. In such examples, the computing device(s) 736 may be configured to perform one or more of the processes described herein with respect to the vehicle 702. In some examples, the azimuth ambiguity detector 742 and the elevation ambiguity detector 744 may perform substantially similar functions as the radar detector 724.

The processor(s) 716 of the vehicle 702 and the processor(s) 738 of the computing device(s) 736 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 740 are examples of non-transitory computer-readable media. The memory 718 and memory 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 8:
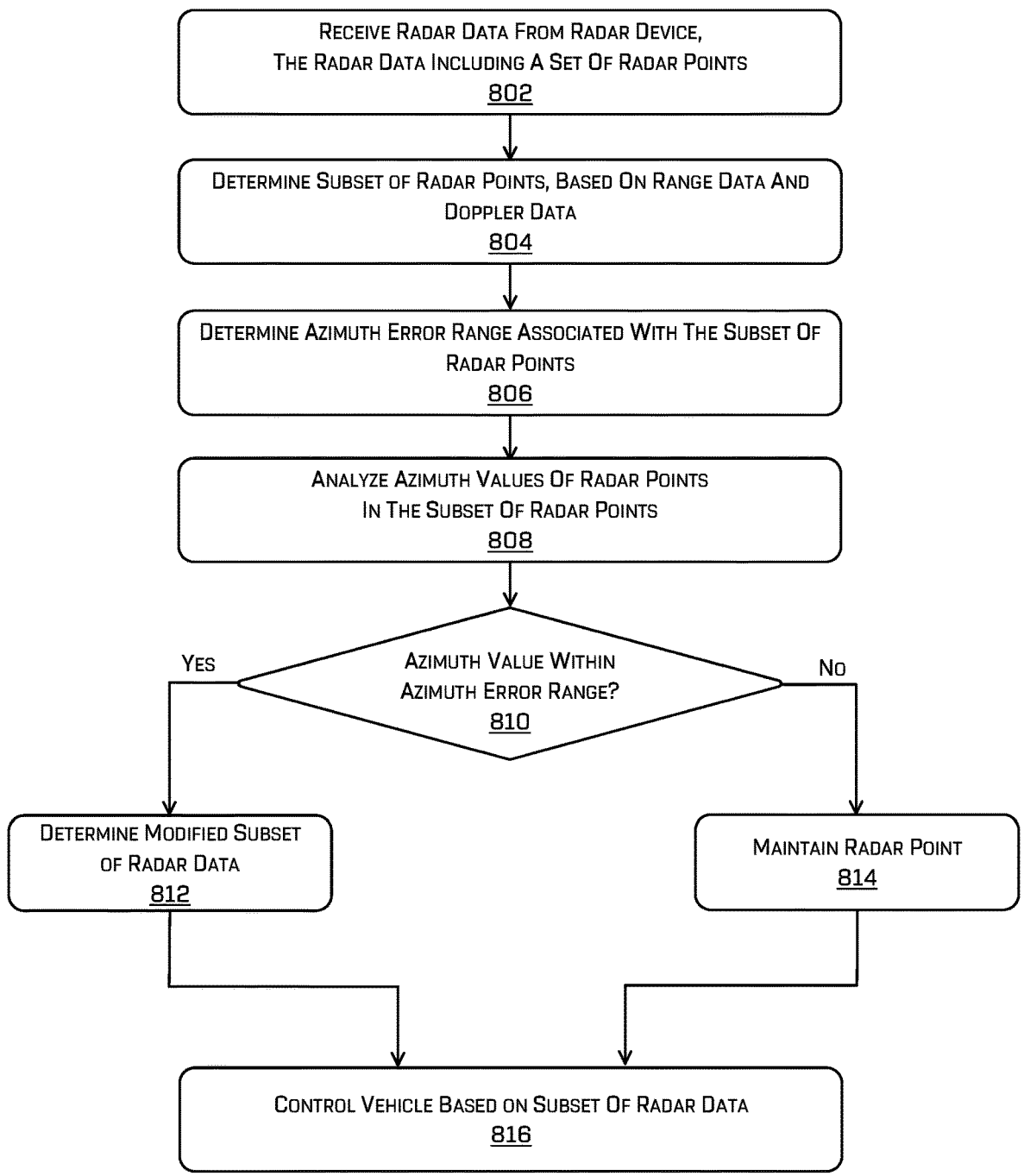
FIG. 8 is a flow diagram illustrating an example process for modifying radar points using multistage clustering based on an azimuth error range, in accordance with one or more examples of the disclosure.

FIG. 8 is a flow diagram illustrating an example process 800 of modifying radar points using multistage clustering based on an azimuth error range. As described below, process 800 includes operations of receiving radar data including a set of radar points, determining a subset of radar points based on radar range data and doppler data of the set of radar points, determining azimuth ambiguities by analyzing azimuth values, and modifying the subset of radar points. In various examples, process 800 may be performed by one or more computer-based components configured to implement various functionalities described herein. For instance, some or all of the operations of process 800 may be performed by a radar detector 202 configured to receive a set of radar points, determine a subset of radar points from the set of radar points, analyze azimuth data based on an azimuth error range, and/or modify the subset of radar points based on an azimuth value of a radar point being within the azimuth error range. As described above, a radar detector 202 may be integrated as an on-vehicle system in some examples.

Process 800 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 802, the radar detector 202 may receive radar data from one or more radar devices of an autonomous vehicle traversing within a driving environment. In some examples, the radar data may include a set of radar points. As described above, an autonomous vehicle may obtain various types of radar data from any number of radar devices. Further, each of the radar devices may be configured to collect a variety of different radar data parameters. For example, some radar devices may capture radar data parameters including range data, azimuth data, doppler data, elevation data, etc.

At operation 804, the radar detector 202 may determine a subset of radar points based on range data and doppler data of the set of radar points. In some examples, the radar detector 202 may determine one or more subsets (e.g., clusters) of radar points based on clustering the set of radar points by range data and doppler data. Further, the radar detector 202 may determine multiple subsets of radar points from the set of radar points.

At operation 806, the radar detector 202 may determine an azimuth error range associated with the subset of radar points. In some examples, the radar detector 202 may determine a number of ranges within which radar points may be present. The radar detector 202 may determine a first azimuth range within which radar points representative of object detections may be present. Further, the radar detector 202 may determine one or more azimuth error ranges within which azimuth ambiguities may be present. The radar detector may determine the one or more azimuth error ranges based on the first azimuth range and an arrangement of antennae of the radar device aperture. Based on the arrangement of antennae of the radar device, the radar detector 202 may predict ranges within which azimuth ambiguities may be found.

At operation 808, the radar detector 202 may analyze azimuth values associated with radar points in the subset of radar points. In some examples, the radar detector 202 may analyze the subsets of radar points based on azimuth values of the radar points. The radar detector 202 may analyze some or all of the subsets of radar points.

At operation 810, the radar detector 202 may determine whether any of the azimuth values in the subset of radar points fall within the error ranges. In some examples, the radar detector 202 may use the azimuth error ranges to determine azimuth ambiguities. As such, if there is one or more radar points have an azimuth value that falls within one or more of the azimuth error ranges (810: Yes), then in operation 814 the radar detector 202 may modify the subset of radar points. In some examples, the radar detector 202 may modify the subset of radar points by assigning a lower likelihood value to the ambiguous radar point, removing the ambiguous radar point, and/or modifying the azimuth values to the ambiguous radar point. In contrast, if one or more azimuth values in the subset of radar points are not within the error ranges (810: No), then in operation 814 the radar detector 202 may maintain (e.g., not modify) the subset of radar data. In some examples, the radar detector 202 may determine that there are no radar points with azimuth values that fall within any of the azimuth error ranges. In such examples, the radar detector 202 may determine that estimated azimuth values of the subset of radar points are accurate.

At operation 816, the radar detector 202 may control an autonomous vehicle based on the radar data. For example, the radar data modified in operation 812, or maintained in operation 814, may be sent to one or more perception components for further processing. In such examples, the radar data may be used to accurately detect and classify objects within a driving environment. Further, the radar data may be used to assist in predicting future actions for one or more objects within a driving environment, in addition to predicting future actions for the autonomous vehicle.

EXAMPLE CLAUSES

A. A system comprising: one or more processors; and one or more computer-readable media storing computer-executable instructions that, when executed, cause the one or more processors to perform operations comprising: receiving, from a radar device, radar data associated with an autonomous vehicle operating in an environment, the radar data including a set of radar points; clustering the set of radar points into a first radar point cluster, based at least in part on range data associated with the set of radar points and doppler data associated with the set of radar points; determining an azimuth error range associated with the first radar point cluster; determining an azimuth value of a first radar point in the first radar point cluster; determining a modified radar point cluster, based at least in part on determining that the azimuth value of the first radar point is within the azimuth error range, wherein determining the modified radar point cluster comprises modifying the first radar point cluster by removing or modifying the first radar point; and controlling navigation of the autonomous vehicle within the environment, based at least in part on the modified radar point cluster.

B. The system of paragraph A, wherein determining the azimuth error range comprises determining, based at least in part on the first radar point cluster: a first azimuth range associated with a detected object; a second azimuth range adjacent to the first azimuth range; and a third azimuth range, as the azimuth error range, adjacent to the second azimuth range.

C. The system of paragraph A, the operations further comprising: determining an antenna configuration associated with the radar device, wherein determining the azimuth error range is based at least in part on the antenna configuration.

D. The system of paragraph A, wherein the azimuth error range is a first azimuth error range, the operations further comprising: determining a second azimuth error range that is different from the first azimuth error range; and determining a second azimuth value associated with a second radar point in the first radar point cluster, wherein determining the modified radar point cluster comprises modifying the first radar point cluster by removing or modifying the second radar point, based at least in part on determining that the second azimuth value is within the second azimuth error range.

E. The system of paragraph A, wherein determining the azimuth error range comprises: determining, based at least in part on the azimuth value associated with the first radar point and a second azimuth value associated with a second radar point in the first radar point cluster, that the first radar point corresponds to a first return path of a radar transmission and the second radar point corresponds to a second return path of the radar transmission.

F. One or more non transitory computer readable media storing instructions executable by one or more processors, wherein the instructions, when executed, cause the one or more processors to perform operations comprising: receiving, from a radar device, radar data including a set of radar points; determining, based at least in part on range data associated with the set of radar points and doppler data associated with the set of radar points, a subset of the set of radar points; determining an error range associated with the subset of radar points, wherein the error range comprises at least one of an azimuth error range or an elevation error range; determining a value associated with a first radar point in the subset of radar points, wherein the value comprises at least one of an azimuth value or an elevation value associated with the first radar point; and determining, based at least in part on determining that the value associated with the first radar point is within the error range, a modified subset of radar points, by modifying at least one of the subset of radar points.

G. The one or more non transitory computer readable media of paragraph F, wherein determining the modified subset of radar points comprises at least one of: removing the first radar point from the subset of radar points; modifying an azimuth associated with the first radar point; modifying an elevation associated with the first radar point; or determining a confidence associated with the first radar point.

H. The one or more non transitory computer readable media of paragraph F, the operations further comprising: determining an antenna configuration associated with the radar device; and determining an angle of arrival associated with a second radar point in the subset of radar points, wherein determining the error range is based at least in part on at least one of the antenna configuration or the angle of arrival.

I. The one or more non transitory computer readable media of paragraph F, wherein determining the error range comprises determining, based at least in part on the subset of radar points: a first range associated with a detected object; a second range adjacent to the first range; and a third range, as the error range, adjacent to the second range.

J. The one or more non transitory computer readable media of paragraph F, wherein the error range is a first error range, the operations further comprising: determining a second error range that is different from the first error range; and determining a second value associated with a second radar point in the subset of radar points, wherein determining the modified subset of radar points comprises modifying the second radar point based at least in part on determining that the second value is within the second error range.

K. The one or more non transitory computer readable media of paragraph F, wherein determining the error range comprises: determining, based at least in part on the value associated with the first radar point and a second value associated with a second radar point in the subset of radar points, that the first radar point corresponds to a return signal associated with a detected object and the second radar point corresponds to a multipath return signal associated with the detected object.

L. The one or more non transitory computer readable media of paragraph F, wherein the error range comprises an azimuth error range and wherein the value comprises an azimuth value, the operations further comprising: determining a second elevation error range associated with the subset of radar points; and determining a second elevation value associated with the first radar point, wherein determining the modified subset of radar points comprises modifying the first radar point based at least in part on determining that the azimuth value is within the azimuth error range and the elevation value is within the elevation error range.

M. The one or more non transitory computer readable media of paragraph F, wherein the radar data is associated with a vehicle operating in an environment, the operations further comprising: controlling navigation of the vehicle within the environment, based at least in part on the modified subset of radar points.

N. A method comprising: receiving, from a radar device, radar data including a set of radar points; determining, based at least in part on range data associated with the set of radar points and doppler data associated with the set of radar points, a subset of the set of radar points; determining an error range associated with the subset of radar points, wherein the error range comprises at least one of an azimuth error range or an elevation error range; determining a value associated with a first radar point in the subset of radar points, wherein the value comprises at least one of an azimuth value or an elevation value associated with the first radar point; and determining, based at least in part on determining that the value associated with the first radar point is within the error range, a modified subset of radar points, by modifying at least one of the subset of radar points.

O. The method of paragraph N, wherein determining the modified subset of radar points comprises at least one of: removing the first radar point from the subset of radar points; modifying an azimuth associated with the first radar point; modifying an elevation associated with the first radar point; or determining a confidence associated with the first radar point.

P. The method of paragraph N, further comprising: determining an antenna configuration associated with the radar device; and determining an angle of arrival associated with a second radar point in the subset of radar points, wherein determining the error range is based at least in part on at least one of the antenna configuration or the angle of arrival.

Q. The method of paragraph N, wherein determining the error range comprises determining, based at least in part on the subset of radar points: a first range associated with a detected object; a second range adjacent to the first range; and a third range, as the error range, adjacent to the second range.

R. The method of paragraph N, wherein the error range is a first error range, and wherein the method further comprises: determining a second error range that is different from the first error range; and determining a second value associated with a second radar point in the subset of radar points, wherein determining the modified subset of radar points comprises modifying the second radar point based at least in part on determining that the second value is within the second error range.

S. The method of paragraph N, wherein determining the error range comprises: determining, based at least in part on the value associated with the first radar point and a second value associated with a second radar point in the subset of radar points, that the first radar point corresponds to a return signal associated with a detected object and the second radar point corresponds to a multipath return signal associated with the detected object.

T. The method of paragraph N, wherein the error range comprises an azimuth error range and wherein the value comprises an azimuth value, the method further comprising: determining a second elevation error range associated with the subset of radar points; and determining a second elevation value associated with the first radar point, wherein determining the modified subset of radar points comprises modifying the first radar point based at least in part on determining that the azimuth value is within the azimuth error range and the elevation value is within the elevation error range.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more computer-readable media storing computer-executable instructions that, when executed, cause the one or more processors to perform operations comprising:
      receiving, from a radar device, radar data associated with an autonomous vehicle operating in an environment, the radar data including a set of radar points;
      clustering the set of radar points into a first radar point cluster, based at least in part on range data associated with the set of radar points and doppler data associated with the set of radar points;
      determining an azimuth error range associated with the first radar point cluster;
      determining an azimuth value of a first radar point in the first radar point cluster;
      determining a modified radar point cluster, based at least in part on determining that the azimuth value of the first radar point is within the azimuth error range, wherein determining the modified radar point cluster comprises modifying the first radar point cluster by removing or modifying the first radar point; and
      controlling navigation of the autonomous vehicle within the environment, based at least in part on the modified radar point cluster.

2. The system of claim 1, wherein determining the azimuth error range comprises determining, based at least in part on the first radar point cluster:
   a first azimuth range associated with a detected object;
   a second azimuth range adjacent to the first azimuth range; and
   a third azimuth range, as the azimuth error range, adjacent to the second azimuth range.

3. The system of claim 1, the operations further comprising:
   determining an antenna configuration associated with the radar device, wherein determining the azimuth error range is based at least in part on the antenna configuration.

4. The system of claim 1, wherein the azimuth error range is a first azimuth error range, the operations further comprising:
   determining a second azimuth error range that is different from the first azimuth error range; and
   determining a second azimuth value associated with a second radar point in the first radar point cluster,
   wherein determining the modified radar point cluster comprises modifying the first radar point cluster by removing or modifying the second radar point, based at least in part on determining that the second azimuth value is within the second azimuth error range.

5. The system of claim 1, wherein determining the azimuth error range comprises:
   determining, based at least in part on the azimuth value associated with the first radar point and a second azimuth value associated with a second radar point in the first radar point cluster, that the first radar point corresponds to a first return path of a radar transmission and the second radar point corresponds to a second return path of the radar transmission.

6. One or more non-transitory computer-readable media storing instructions executable by one or more processors, wherein the instructions, when executed, cause the one or more processors to perform operations comprising:
   receiving, from a radar device, radar data including a set of radar points;
   determining, based at least in part on range data associated with the set of radar points and doppler data associated with the set of radar points, a subset of the set of radar points;
   determining an error range associated with the subset of radar points, wherein the error range comprises at least one of an azimuth error range or an elevation error range;
   determining a value associated with a first radar point in the subset of radar points, wherein the value comprises at least one of an azimuth value or an elevation value associated with the first radar point; and
   determining, based at least in part on determining that the value associated with the first radar point is within the error range, a modified subset of radar points, by modifying at least one of the subset of radar points.

7. The one or more non-transitory computer-readable media of claim 6, wherein determining the modified subset of radar points comprises at least one of:
   removing the first radar point from the subset of radar points;
   modifying an azimuth associated with the first radar point;
   modifying an elevation associated with the first radar point; or
   determining a confidence associated with the first radar point.

8. The one or more non-transitory computer-readable media of claim 6, the operations further comprising:
   determining an antenna configuration associated with the radar device; and
   determining an angle of arrival associated with a second radar point in the subset of radar points, wherein determining the error range is based at least in part on at least one of the antenna configuration or the angle of arrival.

9. The one or more non-transitory computer-readable media of claim 6, wherein determining the error range comprises determining, based at least in part on the subset of radar points:

a first range associated with a detected object;
a second range adjacent to the first range; and
a third range, as the error range, adjacent to the second range.

10. The one or more non-transitory computer-readable media of claim 6, wherein the error range is a first error range, the operations further comprising:
 determining a second error range that is different from the first error range; and
 determining a second value associated with a second radar point in the subset of radar points,
 wherein determining the modified subset of radar points comprises modifying the second radar point based at least in part on determining that the second value is within the second error range.

11. The one or more non-transitory computer-readable media of claim 6, wherein determining the error range comprises:
 determining, based at least in part on the value associated with the first radar point and a second value associated with a second radar point in the subset of radar points, that the first radar point corresponds to a return signal associated with a detected object and the second radar point corresponds to a multipath return signal associated with the detected object.

12. The one or more non-transitory computer-readable media of claim 6, wherein the error range comprises an azimuth error range and wherein the value comprises an azimuth value, the operations further comprising:
 determining a second elevation error range associated with the subset of radar points; and
 determining a second elevation value associated with the first radar point,
 wherein determining the modified subset of radar points comprises modifying the first radar point based at least in part on determining that the azimuth value is within the azimuth error range and the elevation value is within the elevation error range.

13. The one or more non-transitory computer-readable media of claim 6, wherein the radar data is associated with a vehicle operating in an environment, the operations further comprising:
 controlling navigation of the vehicle within the environment, based at least in part on the modified subset of radar points.

14. A method comprising:
 receiving, from a radar device, radar data including a set of radar points;
 determining, based at least in part on range data associated with the set of radar points and doppler data associated with the set of radar points, a subset of the set of radar points;
 determining an error range associated with the subset of radar points, wherein the error range comprises at least one of an azimuth error range or an elevation error range;
 determining a value associated with a first radar point in the subset of radar points, wherein the value comprises at least one of an azimuth value or an elevation value associated with the first radar point; and
 determining, based at least in part on determining that the value associated with the first radar point is within the error range, a modified subset of radar points, by modifying at least one of the subset of radar points.

15. The method of claim 14, wherein determining the modified subset of radar points comprises at least one of:
 removing the first radar point from the subset of radar points;
 modifying an azimuth associated with the first radar point;
 modifying an elevation associated with the first radar point; or
 determining a confidence associated with the first radar point.

16. The method of claim 14, further comprising:
 determining an antenna configuration associated with the radar device; and
 determining an angle of arrival associated with a second radar point in the subset of radar points, wherein determining the error range is based at least in part on at least one of the antenna configuration or the angle of arrival.

17. The method of claim 14, wherein determining the error range comprises determining, based at least in part on the subset of radar points:
 a first range associated with a detected object;
 a second range adjacent to the first range; and
 a third range, as the error range, adjacent to the second range.

18. The method of claim 14, wherein the error range is a first error range, and wherein the method further comprises:
 determining a second error range that is different from the first error range; and
 determining a second value associated with a second radar point in the subset of radar points,
 wherein determining the modified subset of radar points comprises modifying the second radar point based at least in part on determining that the second value is within the second error range.

19. The method of claim 14, wherein determining the error range comprises:
 determining, based at least in part on the value associated with the first radar point and a second value associated with a second radar point in the subset of radar points, that the first radar point corresponds to a return signal associated with a detected object and the second radar point corresponds to a multipath return signal associated with the detected object.

20. The method of claim 14, wherein the error range comprises an azimuth error range and wherein the value comprises an azimuth value, the method further comprising:
 determining a second elevation error range associated with the subset of radar points; and
 determining a second elevation value associated with the first radar point,
 wherein determining the modified subset of radar points comprises modifying the first radar point based at least in part on determining that the azimuth value is within the azimuth error range and the elevation value is within the elevation error range.

\* \* \* \* \*